United States Patent
Hiura

(10) Patent No.: US 11,034,807 B2
(45) Date of Patent: Jun. 15, 2021

(54) WATER-SOLUBLE FILM AND CHEMICAL AGENT PACKAGE

(71) Applicant: Mitsubishi Chemical Corporation, Tokyo (JP)

(72) Inventor: Takahiro Hiura, Osaka (JP)

(73) Assignee: MITSUBISHI CHEMICAL CORPORATION, Tokyo (JP)

(*) Notice: Subject to any disclaimer, the term of this patent is extended or adjusted under 35 U.S.C. 154(b) by 42 days.

(21) Appl. No.: 16/423,726

(22) Filed: May 28, 2019

(65) Prior Publication Data

US 2019/0284356 A1    Sep. 19, 2019

Related U.S. Application Data

(63) Continuation of application No. PCT/JP2017/046198, filed on Dec. 22, 2017.

(30) Foreign Application Priority Data

Dec. 27, 2016 (JP) .............................. JP2016-252832

(51) Int. Cl.

| C08J 5/18 | (2006.01) |
|---|---|
| B65D 65/46 | (2006.01) |
| B65D 75/28 | (2006.01) |
| B65D 75/30 | (2006.01) |
| C08K 5/053 | (2006.01) |
| C08L 29/04 | (2006.01) |

(52) U.S. Cl.
CPC ............... *C08J 5/18* (2013.01); *B65D 65/46* (2013.01); *B65D 75/28* (2013.01); *B65D 75/30* (2013.01); *C08K 5/053* (2013.01); *C08L 29/04* (2013.01); *C08J 2329/04* (2013.01); *C08L 2205/025* (2013.01)

(58) Field of Classification Search
CPC ......... C08J 5/18; C08J 2329/04; B65D 65/46; B65D 75/28; B65D 75/30; C08K 5/053; C08L 29/04; C08L 2205/025
USPC ....................................................... 524/381
See application file for complete search history.

(56) References Cited

U.S. PATENT DOCUMENTS

| 2004/0092635 A1 | 5/2004 | Kitamura et al. |
| 2016/0280869 A1 | 9/2016 | Nii et al. |
| 2017/0298216 A1 | 10/2017 | Labeque et al. |

FOREIGN PATENT DOCUMENTS

| EP | 1418196 A1 | 5/2004 | |
| JP | 2001-329130 | 11/2001 | |
| JP | 2004-161823 | 6/2004 | |
| WO | 2011/094470 A1 | 8/2011 | |
| WO | 2016/160116 | 10/2016 | |
| WO | WO-2016160116 A1 * | 10/2016 | ........... C08K 5/0016 |

OTHER PUBLICATIONS

Glycerol—www.inchem.org/documents/icsc/icsc/eics0624.htm (Year: 2006).*
Sorbitol—www.inchem.org/documents/icsc/icsc/eics0892.htm (Year: 2002).*
1,1,1-Trimethylolpropane—www.inchem.org/documents/icsc/icsc/eics0366.htm (Year: 2005).*
European Search Report issued for European Patent Application No. 17887303.0 dated Dec. 16, 2019.
Official Communication issued in International Bureau of WIPO Patent Application No. PCT/JP2017/046198, dated Mar. 13, 2018.
IPRP issued in International Bureau of WIPO Patent Application No. PCT/JP2017/046198 , dated Jul. 11, 2019.

* cited by examiner

*Primary Examiner* — Ling Siu Choi
*Assistant Examiner* — Ronald Grinsted
(74) *Attorney, Agent, or Firm* — Greenblum & Bernstein, P.L.C.

(57) ABSTRACT

A water-soluble film that shows a small change between a film hardness at the time of its normal state and a film hardness at high temperature at the time of its forming or immediately after the forming, that has satisfactory formability, and that is excellent in pinhole resistance and bag breakage resistance includes: a polyvinyl alcohol resin (A); and a plasticizer (B), wherein the plasticizer (B) contains a polyhydric alcohol (b1) having a melting point of 80° C. or more, a polyhydric alcohol (b2) having a melting point of 50° C. or less, and a polyhydric alcohol (b3) having a melting point of more than 50° C. and less than 80° C., and wherein a content ratio (X) of the polyhydric alcohol (b3) with respect to a total amount of the polyhydric alcohols (b1), (b2), and (b3) is 15 wt. % or less.

20 Claims, No Drawings

WATER-SOLUBLE FILM AND CHEMICAL AGENT PACKAGE

RELATED APPLICATION

This application is a continuation of International Application No. PCT/JP2017/046198, filed on Dec. 22, 2017, which claims priority to Japanese Patent Application No. 2016-252832, filed on Dec. 27, 2016, the entire contents of each of which being hereby incorporated by reference.

TECHNICAL FIELD

The present disclosure relates to a water-soluble film including a polyvinyl alcohol resin as a main component, and more specifically, to a water-soluble film that is excellent in formability, and that is excellent in pinhole resistance and bag breakage resistance when formed into a chemical agent package, and a chemical agent package obtained by using the film.

A polyvinyl alcohol is hereinafter sometimes abbreviated as "PVA", and a water-soluble film including a polyvinyl alcohol resin as a main component is hereinafter sometimes abbreviated as "PVA water-soluble film" or simply as "water-soluble film".

BACKGROUND ART

A PVA film is a film formed of a thermoplastic PVA resin having water solubility, and the film is largely different from a hydrophobic film that is frequently used for a packaging film or the like in ordinary cases, such as a polyethylene terephthalate film or a polyolefin film, in, for example, various film physical properties and texture.

A chemical agent portion package (unit package) obtained by incorporating any one of various chemical agents, such as an agricultural chemical and a detergent, into a bag formed of a film of the PVA resin through the exploitation of the water solubility of the PVA resin has heretofore been proposed, and has been used in a wide variety of applications.

As a water-soluble unit packaging bag to be used in such applications, for example, there has been known a water-soluble film obtained by blending 100 parts by weight of a PVA with 5 parts by weight to 30 parts by weight of a plasticizer, 1 part by weight to 10 parts by weight of starch, and 0.01 parts by weight to 2 parts by weight of a surfactant (see, for example, PTL 1), or a water-soluble film formed of a resin composition containing 20 parts by weight to 50 parts by weight of a plasticizer, 2 parts by weight to 30 parts by weight of a filler, and 0.01 parts by weight to 2.5 parts by weight of a surfactant with respect to 100 parts by weight of an anionic group-modified PVA resin having a 4 wt. % aqueous solution viscosity at 20° C. of from 10 mPa·s to 35 mPa·s, an average saponification degree of from 80.0 mol % to 99.9 mol %, and an anionic group modification amount of from 1 mol % to 10 mol % (see, for example, PTL 2).

RELATED ART DOCUMENTS

Patent Documents

PTL 1: JP-A-2001-329130
PTL 2: JP-A-2004-161823

SUMMARY

Any such water-soluble film is required to have easy formability when formed into a chemical agent package having packaged therein a liquid detergent or the like. That is, the film is required to: soften under heating at the time of the forming, for example, at from 50° C. to 60° C., to be easily formed into a target shape; and maintain the formed shape after its temperature returns to normal temperature (about 25° C.)

Accordingly, such water-soluble film as described above is typically blended with a plasticizer, and hence the water-soluble film is configured to be softened by a heating temperature at the time of its forming to such an extent as to be formable. However, when the operation of, for example, pressurizing the water-soluble film to press the film against a die is performed under a state in which the water-soluble film is softened by the heating at the time of the forming, in some cases, the thickness of the film may become so small in a pressurized portion as to cause the strain or breakage of the film. In such cases, a heating condition and a pressure condition need to be subtly adjusted, and hence complicated labor is required.

In addition, the water-soluble film passes from a relatively hard state under normal temperature to a softened state at the time of heating, and back to a relatively hard state at normal temperature again after heating and forming. Accordingly, the polymer structure of the water-soluble film may be partially damaged by an influence of the state change to cause a pinhole or bag breakage.

However, in each of the water-soluble films disclosed in PTL 1 and PTL 2 described above, the formability of the water-soluble film has not been sufficiently considered, and hence a further improvement of a water-soluble film to be used for a chemical agent package or the like has been required.

In view of the foregoing, according to the present disclosure there are provided a water-soluble film that shows a small change between a film hardness in a normal state [in a state of being placed under normal temperature and normal pressure (typically 25° C. and 1 atmosphere)] and a film hardness at high temperature at the time of its forming or immediately after the forming, that has satisfactory formability, and that is excellent in pinhole resistance and bag breakage resistance, and a chemical agent package in which the water-soluble film is used for chemical agent packaging.

To provide such water-soluble film and chemical agent package, the inventor has made extensive investigations, and as a result, has found that when three kinds of polyhydric alcohols having different melting points are used in combination in a water-soluble film including a PVA resin (A) and a plasticizer (B), and such plasticizer composition that the amount of the polyhydric alcohol having a moderate melting point is equal to or less than a predetermined amount is established, required characteristics are obtained.

That is, a plasticizer is typically blended in a water-soluble film for imparting easy formability at the time of forming, and when trimethylolpropane is used as the plasticizer, formability at relatively high temperature is obtained. Meanwhile, however, when pressure forming is performed under a state in which the water-soluble film is softened by heating at the time of the forming, the thickness of the film may become so small in a pressurized portion as to cause the strain or breakage of the film. In view of the foregoing, the inventor has made a detailed investigation on the combination of such plasticizer compositions that the physical properties of the water-soluble film become optimum in a relationship with such formability, and as a result, has obtained the required characteristics.

Based on the investigations, according to a first embodiment of the present disclosure, there is provided a water-soluble film, including: a PVA resin (A); and a plasticizer (B), wherein the plasticizer (B) contains a polyhydric alcohol (b1) having a melting point of 80° C. or more, a polyhydric alcohol (b2) having a melting point of 50° C. or less, and a polyhydric alcohol (b3) having a melting point of more than 50° C. and less than 80° C., and wherein a content ratio (X) of the polyhydric alcohol (b3) with respect to a total amount of the polyhydric alcohol (b1), the polyhydric alcohol (b2), and the polyhydric alcohol (b3) is 15 wt. % or less.

In addition, according to a second embodiment of the present disclosure, there is provided a chemical agent package, including: a package bag obtained by bonding at least two water-soluble films of the first embodiment to each other; and a liquid chemical agent included in the package bag.

In the water-soluble film of the present disclosure, as described above, the three kinds of polyhydric alcohols (b1), (b2), and (b3) having different melting points are combined as the plasticizer (B) to be incorporated into the water-soluble film, and the content ratio (X) of the polyhydric alcohol (b3) with respect to the total amount of the polyhydric alcohols (b1) to (b3) is limited so as to fall within a specific range.

The water-soluble film of the present disclosure has not only excellent water solubility but also the following special physical property: a change between a film hardness in the normal state and a film hardness under high temperature at the time of its forming or immediately after the forming is small, and hence an influence of its state change on the structure of the film is small. Therefore, unlike the related-art films, the film does not become so thin from pressurization at the time of the forming as to be broken or strained. In addition, the film can be widely used in various applications, in particular, as a packaging material, because the film is excellent in pinhole resistance and bag breakage resistance.

In addition, the chemical agent package provided as the package by packaging the liquid chemical agent, such as a liquid detergent, with the water-soluble film of the present disclosure can maintain the liquid chemical agent in a stable state over a long time period because pinholes and bag breakage do not occur in the water-soluble film.

In addition, when the water-soluble film of the present disclosure includes an anionic group-modified PVA resin as the PVA resin (A), its solubility in water improves.

Further, when the water-soluble film of the present disclosure includes both of an anionic group-modified PVA resin and an unmodified PVA as the PVA resins (A), its water sealability improves.

In addition, when the content of the plasticizer (B) in the water-soluble film of the present disclosure is 25 parts by weight or more with respect to 100 parts by weight of the PVA resin (A), the easy formability of the water-soluble film improves.

In addition, in the water-soluble film of the present disclosure, when the content ratio (b3/b1) of the polyhydric alcohol (b3) to the polyhydric alcohol (b1) is from 0.02 to 8 in terms of weight ratio, or when the content ratio (b3/b2) of the polyhydric alcohol (b3) to the polyhydric alcohol (b2) is from 0.02 to 8 in terms of weight ratio, the pinhole resistance and bag breakage resistance of the film among others further improve.

In addition, when the water-soluble film of the present disclosure has a water content of from 3 wt. % 15 wt %, the mechanical strength and sealability of the film further improve.

The chemical agent package including the package bag obtained by bonding the water-soluble films to each other and the liquid chemical agent included in the package bag serves as a suitable use form of the chemical agent because the chemical agent package holds such a shape as to include the liquid chemical agent therein at the time of its conveyance or storage, and is smoothly dissolved in water to diffuse the included chemical agent in the water at the time of its use. In addition, the chemical agent package is suitable as a package in which a chemical agent is individually packaged.

In addition, in the chemical agent package of the present disclosure, in the case where the liquid chemical agent has a pH value of from 6 to 12 when dissolved or dispersed in water, and the liquid chemical agent has a water content of 15 wt. % or less, the films do not gel or become insoluble. Accordingly, the chemical agent package is more smoothly dissolved at the time of its use, and hence does not inhibit the diffusion of the liquid chemical agent.

DESCRIPTION OF EMBODIMENTS

The present disclosure is specifically described below, but the description describes an example of a desired embodiment, and the present disclosure is not limited to the contents of the description.

In the present disclosure, the term "(meth)acryl" is meant to represent at least one of acryl and methacryl, and the term "(meth) acrylate" is meant to represent at least one of an acrylate and a methacrylate.

A water-soluble film of the present disclosure includes a PVA resin (A) as a main component, and further includes a plasticizer (B). The term "main component" as used herein refers to a component accounting for more than half of the entirety of the film, and is meant to include a case in which nearly the entirety is formed only of the main component. Of such cases, a case in which the PVA resin (A) is incorporated at 50 wt. % or more, in particular, 70 wt. % or more into the water-soluble film is more preferred.

First, the PVA resin (A) is described.

Examples of the PVA resin (A) to be used in the present disclosure include an unmodified PVA and a modified PVA resin.

The average saponification degree of the PVA resin (A) to be used in the present disclosure is preferably 80 mol % or more, particularly preferably from 82 mol % to 99.9 mol %, more preferably from 85 mol % to 98.5 mol %, still more preferably from 90 mol % to 97 mol %. In addition, when an unmodified PVA is used as the PVA resin (A), its average saponification degree is preferably 80 mol % or more, particularly preferably from 82 mol % to 99 mol %, more preferably from 85 mol % to 90 mol %. In addition, when a modified PVA resin is used as the PVA resin (A), its average saponification degree is preferably 80 mol % or more, particularly preferably from 85 mol % to 99.9 mol %, more preferably from 90 mol % to 98 mol %. Further, when an anionic group-modified PVA resin is used as the PVA resin (A), its average saponification degree is preferably 85 mol % or more, particularly preferably from 88 mol % to 99 mol %, more preferably from 90 mol % to 97 mol %. When such average saponification degree is excessively small, the solubility of the water-soluble film in water tends to reduce with time depending on the pH of a chemical agent to be packaged. When the average saponification degree is excessively large, the solubility in water tends to significantly decrease owing to thermal history at the time of film formation.

The polymerization degree of the PVA resin (A) may be generally represented by an aqueous solution viscosity, and its 4 wt. % aqueous solution viscosity at 20° C. is preferably from 5 mPa·s to 50 mPa·s, particularly preferably from 13 mPa·s to 45 mPa·s, more preferably from 17 mPa·s to 40 mPa·s. In addition, when an unmodified PVA is used as the PVA resin (A), the 4 wt. % aqueous solution viscosity of the unmodified PVA at 20° C. is preferably from 5 mPa·s to 50 mPa·s, particularly preferably from 13 mPa·s to 45 mPa·s, more preferably from 17 mPa·s to 40 mPa·s. In addition, when a modified PVA resin is used as the PVA resin (A), the 4 wt. % aqueous solution viscosity of the modified PVA resin at 20° C. is preferably from 5 mPa·s to 50 mPa·s, particularly preferably from 13 mPa·s to 45 mPa·s, more preferably from 17 mPa·s to 30 mPa·S. When such viscosity is excessively low, the mechanical strength of the water-soluble film serving as a packaging material tends to reduce. Meanwhile, when the viscosity is excessively low, the aqueous solution viscosity of the resin at the time of film formation is high, and hence the productivity of the film tends to reduce.

The average saponification degree is measured in conformity with JIS K 6726 3.5, and the 4 wt. % aqueous solution viscosity is measured in conformity with JIS K 6726 3.11.2 (the same holds true for the following).

Examples of the modified PVA resin to be used in the present disclosure include an anionic group-modified PVA resin, a cationic group-modified PVA resin, and a nonionic group-modified PVA resin. Of those, the anionic group-modified PVA resin is preferably used in terms of the solubility of the water-soluble film in water. Examples of the kind of the anionic group include a carboxyl group, a sulfonic acid group, and a phosphoric acid group. Of those, the carboxyl group or the sulfonic acid group is preferred in terms of the chemical resistance of the film and the stability thereof with time, and a carboxyl group is particularly preferred.

In the present disclosure, the modification amount of the anionic group-modified PVA resin is preferably from 1 mol % to 10 mol %, particularly preferably from 2 mol % to 9 mol %, more preferably from 2 mol % to 8 mol %, still more preferably from 3 mol % to 7 mol %. When such modification amount is excessively small, the solubility of the resin in water tends to reduce. When the modification amount is excessively large, the productivity of the PVA resin tends to reduce, or the biodegradability thereof tends to reduce. In addition, blocking of the water-soluble film is liable to occur, and hence the practicality thereof reduces.

In the present disclosure, the PVA resins (A) may be used alone. In addition, the unmodified PVA and the modified PVA resin may be used in combination. Further, for example, two or more kinds of PVA resins different from each other in saponification degree, viscosity, modifying group, modification amount, or the like may be used in combination. In the present disclosure, the modified PVA resin out of such resins is preferably incorporated as the PVA resin (A). Of such cases, a case in which the anionic group-modified PVA resin is incorporated, or a case in which the anionic group-modified PVA resin and the unmodified PVA are incorporated is preferred in terms of the solubility of the water-soluble film in water and the sealability thereof, and a case in which the anionic group-modified PVA resin and the unmodified PVA are incorporated is particularly preferred.

The content ratio (modified PVA resin/unmodified PVA) of the modified PVA resin to the unmodified PVA is preferably from 95/5 to 60/40, particularly preferably from 94/6 to 70/30, more preferably from 93/7 to 80/20 in terms of weight ratio. When such content ratio is excessively small, the solubility of the water-soluble film in water tends to reduce, and when the ratio is excessively large, the sealability thereof tends to reduce.

In addition, when the modified PVA resin and the unmodified PVA are used in combination, the 4 wt. % aqueous solution viscosity of the unmodified PVA at 20° C. is preferably from 5 mPa·s to 50 mPa·s, particularly preferably from 8 mPa·s to 45 mPa·s, more preferably from 12 mPa·s to 40 mPa·s, still more preferably from 15 mPa·s to 35 mPa·s. When such viscosity is excessively small, the mechanical strength of the water-soluble film serving as a packaging material tends to reduce. Meanwhile, when the viscosity is excessively high, the aqueous solution viscosity of the resin at the time of film formation is high, and hence the productivity of the film tends to reduce.

Next, the PVA resin (A) to be used in the present disclosure is produced, for example, as described below.

The unmodified PVA may be produced by saponifying a vinyl ester polymer obtained by polymerizing a vinyl ester compound.

Examples of such vinyl ester compound include vinyl formate, vinyl acetate, vinyl trifluoroacetate, vinyl propionate, vinyl butyrate, vinyl caprate, vinyl laurate, vinyl versatate, vinyl palmitate, and vinyl stearate. Of those, vinyl acetate is preferably used. The vinyl ester compounds may be used alone or in combination thereof.

The modified PVA resin may be produced by, for example, a method involving copolymerizing the vinyl ester compound and an unsaturated monomer copolymerizable with the vinyl ester compound, and then saponifying the resultant copolymer, or a method involving post-modifying the unmodified PVA.

In the present disclosure, any one of the following unsaturated monomers copolymerizable with the vinyl ester compound may be copolymerized, but when the modified PVA resin is to be obtained, an unsaturated monomer having a modifying group out of the following unsaturated monomers needs to be copolymerized. Examples of the unsaturated monomer include: olefins, such as ethylene, propylene, isobutylene, α-octene, α-dodecene, and α-octadecene; hydroxy group-containing α-olefins, such as 3-buten-1-ol, 4-penten-1-ol, and 5-hexen-1-ol, and derivatives thereof, such as acylated products thereof; unsaturated acids, such as acrylic acid, methacrylic acid, crotonic acid, maleic acid, maleic anhydride, itaconic acid, and undecylenic acid, and salts, monoesters, or dialkyl esters thereof; amides, such as diacetone acrylamide, acrylamide, and methacrylamide; and olefin sulfonic acids, such as ethylenesulfonic acid, allylsulfonic acid, and methallylsulfonic acid, and salts thereof. Those unsaturated monomers may be used alone or in combination thereof. The content ratio of the copolymerizable unsaturated monomer is typically 10 mol % or less with respect to the total of the vinyl ester compound and the copolymerizable unsaturated monomer.

In addition, the modified PVA resin is, for example, a resin having a primary hydroxy group in a side chain thereof in which, for example, the number of primary hydroxy groups in the side chain is typically from 1 to 5, preferably 1 or 2, particularly preferably 1, and the resin preferably further has a secondary hydroxy group in addition to the primary hydroxy group. Examples of such modified PVA resin include a PVA resin having a hydroxyalkyl group in a side chain thereof and a PVA resin having a 1,2-diol structural unit in a side chain thereof. The PVA resin having a 1,2-diol structural unit in a side chain thereof may be produced by, for example: (i) a method involving saponifying a copolymer of vinyl acetate and 3,4-diacetoxy-1-butene; (ii) a method involving saponifying and decarboxylating a copolymer of vinyl acetate and vinyl ethylene carbonate; (iii) a method involving saponifying and deketalizing a copolymer of vinyl acetate and a 2,2-dialkyl-4-vinyl-1,3-dioxolane; or (iv) a method involving saponifying a copolymer of vinyl acetate and glycerin monoallyl ether.

A known polymerization method, such as a solution polymerization method, an emulsion polymerization method, or a suspension polymerization method, may be arbitrarily used as a polymerization method in the preparation of the PVA resin (A). However, the preparation is typically performed by a solution polymerization method involving using a lower alcohol, such as methanol, ethanol, or isopropyl alcohol, as a solvent. In the case of the modified PVA resin, such arbitrary methods as described below may each be used as a method of loading monomers in such solution polymerization method: a method involving loading the total amount of the vinyl ester compound and part of, for example, the unsaturated monomer having a carboxyl group first, initiating their polymerization, and adding the remaining unsaturated monomer in a continuous or divided manner during the period of the polymerization; and a method involving loading the unsaturated monomer having a carboxyl group in a lump.

Known polymerization catalysts, such as azo catalysts including azobisisobutyronitrile, and peroxide catalysts including acetyl peroxide, benzoyl peroxide, and lauroyl peroxide, may each be appropriately selected and blended in accordance with the polymerization method. In addition, the reaction temperature of the polymerization is appropriately selected from the range of from 50° C. to about the boiling point of the selected polymerization catalyst.

The saponification is performed in the presence of a saponification catalyst by dissolving the resultant copolymer in an alcohol. Examples of the alcohol include alcohols each having 1 to 5 carbon atoms, such as methanol, ethanol, and butanol. Those alcohols may be used alone or in combination thereof. In addition, the concentration of the copolymer in the alcohol is selected from the range of from 20 wt. % to 50 wt. %.

For example, alkali catalysts, such as hydroxides and alcoholates of alkali metals including sodium hydroxide, potassium hydroxide, sodium methylate, sodium ethylate, and potassium methylate, may each be used as the saponification catalyst, and an acid catalyst may also be used. The usage amount of the saponification catalyst is preferably set to from 1 millimole equivalent to 100 millimole equivalents with respect to the vinyl ester compound. Those saponification catalysts may be used alone or in combination thereof.

A carboxyl group-modified PVA resin included in the category of the modified PVA resin may be produced by an arbitrary method, and examples thereof include: (I) a method involving copolymerizing an unsaturated monomer having a carboxyl group and a vinyl ester compound, and then saponifying the resultant copolymer; and (II) a method involving polymerizing the vinyl ester compound while causing, for example, an alcohol, aldehyde, or thiol having a carboxyl group to coexist as a chain transfer agent, and then saponifying the resultant polymer.

The various vinyl ester compounds described in the foregoing may each be used as the vinyl ester compound in the method (I) or (II). Of those, vinyl acetate is preferably used.

Examples of the unsaturated monomer having a carboxyl group in the method (I) include monomers, such as ethylenically unsaturated dicarboxylic acids (e.g., maleic acid, fumaric acid, and itaconic acid), ethylenically unsaturated dicarboxylic acid monoesters (e.g., maleic acid monoalkyl ester, fumaric acid monoalkyl ester, and itaconic acid monoalkyl ester), ethylenically unsaturated dicarboxylic acid diesters (e.g., maleic acid dialkyl ester, fumaric acid dialkyl ester, and itaconic acid dialkyl ester), provided that those diesters are each required to be transformed into a carboxyl group by hydrolysis at the time of saponification of the copolymer, ethylenically unsaturated carboxylic acid anhydrides (e.g., maleic anhydride and itaconic anhydride), and ethylenically unsaturated monocarboxylic acids (e.g., (meth) acrylic acid and crotonic acid), and salts thereof. Of those, maleic acid, the maleic acid monoalkyl ester, the maleic acid dialkyl ester, the maleic acid salt, maleic anhydride, itaconic acid, the itaconic acid monoalkyl ester, the itaconic acid dialkyl ester, and (meth) acrylic acid are preferably used, maleic acid, the maleic acid monoalkyl ester, the maleic acid dialkyl ester, the maleic acid salt, and maleic anhydride are particularly preferably used, and the maleic acid monoalkyl ester is more preferably used. Those monomers may be used alone or in combination thereof.

In the method (II), a compound derived from a thiol, the compound having a particularly large chain transfer effect, is effective, and examples thereof include compounds represented by the following general formulae (1) to (3).

$$HS-(CH_2)_n-COOH \qquad (1)$$

In the general formula (1), "n" represents an integer of from 0 to 5.

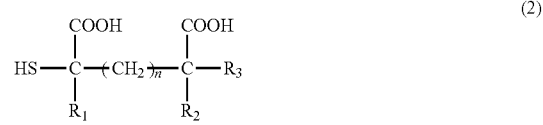

$$HS-\underset{R_1}{\overset{COOH}{\underset{|}{C}}}-(CH_2)_m-\underset{R_2}{\overset{COOH}{\underset{|}{C}}}-R_3 \qquad (2)$$

In the general formula (2), "n" represents an integer of from 0 to 5, and $R_1$, $R_2$, and $R_3$ each represent a hydrogen atom or a lower alkyl group (that may contain a substituent).

$$CH_3(CH_2)_n-\underset{SH}{\overset{|}{CH}}-COOH \qquad (3)$$

In the general formula (3), "n" represents an integer of from 0 to 20.

The examples also include salts of the compounds represented by the general formulae (1) to (3). Specific examples thereof include a mercaptoacetic acid salt, a 2-mercaptopropionic acid salt, a 3-mercaptopropionic acid salt, and a 2-mercaptostearic acid salt. Those compounds may be used alone or in combination thereof.

A method of producing the carboxyl group-modified PVA resin is not limited to the above-mentioned methods, and for example, a post-modification method involving causing a carboxyl group-containing compound having a functional group having reactivity with a hydroxy group, such as a dicarboxylic acid, an aldehyde carboxylic acid, or a hydroxycarboxylic acid, to post-react with a PVA resin (a partially saponified product or a completely saponified product) may also be performed.

In addition, when a sulfonic acid-modified PVA resin, which is modified with a sulfonic acid group, is used, the sulfonic acid-modified PVA resin may be produced by, for example, a method involving copolymerizing a copolymerizable component of a sulfonic acid, such as vinylsulfonic acid, styrenesulfonic acid, allylsulfonic acid, methallylsulfonic acid, or 2-acrylamido-2-methylpropanesulfonic acid, or a salt thereof, and a vinyl ester compound, and then saponifying the resultant copolymer, or a method involving subjecting, for example, vinylsulfonic acid or a salt thereof, or 2-acrylamido-2-methylpropanesulfonic acid or a salt thereof to Michael addition to a PVA resin.

Meanwhile, an example of the method involving post-modifying the unmodified PVA is a method involving subjecting the unmodified PVA to acetoacetic acid esterification, acetalization, urethanation, etherification, grafting, phosphoric acid esterification, or oxyalkylenation.

The polymerization may be performed by incorporating any other general monomer in addition to the unsaturated monomer having a carboxyl group and the vinyl ester compound to the extent that the water solubility of the resin to be obtained is not impaired, and for example, an alkyl ester of an ethylenically unsaturated carboxylic acid, an allyl ester of a saturated carboxylic acid, an α-olefin, an alkyl vinyl ether, an alkyl allyl ether, (meth) acrylamide, (meth) acrylonitrile, styrene, and vinyl chloride may each be used as such monomer. Those monomers may be used alone or in combination thereof.

In the present disclosure, when the water-soluble film of the present disclosure is used to provide a chemical agent package, the plasticizer (B) to be used together with the PVA resin (A) serves to impart flexibility to the water-soluble film and to impart easy formability at the time of forming thereto. It is important that three kinds to be described below be used in combination as the plasticizer (B).

That is, the plasticizer (B) to be used in the present disclosure contains the following three kinds, preferably contains the three kinds as main components, and is particularly preferably formed only of the three kinds: a polyhydric alcohol (b1) having a melting point of 80° C. or more (hereinafter sometimes abbreviated as "polyhydric alcohol (b1)"), a polyhydric alcohol (b2) having a melting point of 50° C. or less (hereinafter sometimes abbreviated as "polyhydric alcohol (b2)"), and a polyhydric alcohol (b3) having a melting point of more than 50° C. and less than 80° C. (hereinafter sometimes abbreviated as "polyhydric alcohol (b3)").

As the polyhydric alcohol (b1) having a melting point of 80° C. or more, most sugar alcohols, monosaccharides, and polysaccharides are applicable. Examples of the polyhydric alcohol (b1) include: dihydric alcohols, such as salicyl alcohol (83° C.), catechol (105° C.), resorcinol (110° C.), hydroquinone (172° C.), bisphenol A (158° C.), bisphenol F (162° C.), and neopentyl glycol (127° C.); trihydric alcohols, such as phloroglucinol (218° C.); tetrahydric alcohols, such as erythritol (121° C.), threitol (88° C.), and pentaerythritol (260° C.); pentahydric alcohols, such as xylitol (92° C.), arabitol (103° C.), fucitol (153° C.), glucose (146° C.), and fructose (104° C.); hexahydric alcohols, such as mannitol (166° C.), sorbitol (95° C.), and inositol (225° C.); octahydric alcohols, such as lactitol (146° C.), sucrose (186° C.), and trehalose (97° C.); and nonahydric or higher alcohols, such as maltitol (145° C.). Those polyhydric alcohols (b1) may be used alone or in combination thereof. The melting point of each compound is shown in the parentheses (the same holds true for the following).

Of those described above, in terms of the tensile strength of the water-soluble film, an alcohol having a melting point of 85° C. or more, in particular, 90° C. or more is preferred. The upper limit of the melting point is preferably 300° C., is particularly preferably 200° C., and is more preferably 100° C. because the control of the elastic modulus of the film is facilitated.

Further, in the present disclosure, the number of hydroxy groups in a molecule of the polyhydric alcohol (b1) is preferably 4 or more in terms of compatibility with the PVA resin (A), and is particularly preferably from 5 to 10, more preferably from 6 to 8. Suitable specific examples of the alcohol satisfying such condition include sorbitol, sucrose, and trehalose.

In addition, in the present disclosure, the molecular weight of the polyhydric alcohol (b1) is preferably 150 or more in terms of the tension of the water-soluble film, and is particularly preferably from 160 to 500, more preferably from 180 to 400. Suitable specific examples of the alcohol satisfying such condition include sorbitol and sucrose.

Meanwhile, as the polyhydric alcohol (b2) having a melting point of 50° C. or less, most aliphatic alcohols are applicable. Preferred examples of the polyhydric alcohol (b2) include: dihydric alcohols, such as ethylene glycol (−13° C.), diethylene glycol (−11° C.), triethylene glycol (−7° C.), propylene glycol (−59° C.), tetraethylene glycol (−5.6° C.), 1,3-propanediol (−27° C.), 1,4-butanediol (20° C.), 1,6-hexanediol (40° C.), tripropylene glycol, polyethylene glycol having a molecular weight of 2,000 or less, and polypropylene glycol (−31° C.); and trihydric or higher alcohols, such as glycerin (18° C.), diglycerin, and triethanolamine (21° C.). In addition, the melting point is preferably 30° C. or less in terms of the flexibility of the water-soluble film, and is particularly preferably 20° C. or less. The lower limit of the melting point is typically −80° C., preferably −10° C., particularly preferably 0° C. Those alcohols may be used alone or in combination thereof.

Further, in the present disclosure, the number of hydroxy groups in a molecule of the polyhydric alcohol (b2) is preferably 4 or less, and is particularly preferably 3 or less because the control of the flexibility near room temperature (25° C.) is facilitated. Specifically, glycerin is suitable as the alcohol satisfying such condition.

In addition, in the present disclosure, the molecular weight of the polyhydric alcohol (b2) is preferably 100 or less because the control of the flexibility is facilitated, and is particularly preferably from 50 to 100, more preferably from 60 to 95. Specifically, glycerin is suitable as the alcohol satisfying such condition.

Further, a suitable specific example of the polyhydric alcohol (b3) having a melting point of more than 50° C. and less than 80° C. is trimethylolpropane (58° C.)

In the plasticizer (B), a plasticizer except the three kinds of polyhydric alcohols (b1), (b2), and (b3) may be used in combination. Examples of such plasticizer include: alcohols, such as diethylene glycol monomethyl ether, cyclohexanol, and carbitol; ethers, such as dibutyl ether; carboxylic acids, such as stearic acid, oleic acid, linoleic acid, linolenic acid, sorbic acid, citric acid, and adipic acid; ketones, such as cyclohexanone; amines, such as monoethanolamine, triethanolamine, ethylenediamine, and an imidazole compound; and amino acids, such as alanine, glycine, aspartic acid, glutamic acid, histidine, lysine, and cysteine. Those plasticizers may be used alone or in combination thereof.

In the present disclosure, the content of the plasticizer (B) is preferably 25 parts by weight or more, particularly preferably from 27 parts by weight to 70 parts by weight, more preferably from 30 parts by weight to 60 parts by weight, still more preferably from 35 parts by weight to 50 parts by weight with respect to 100 parts by weight of the PVA resin (A). When such content of the plasticizer (B) is excessively small, in the case where a package is provided by packaging a liquid, such as a liquid chemical agent, with the water-soluble film, the tension of the water-soluble film tends to be impaired with time. When the content is excessively large, the mechanical strength of the film tends to reduce.

The content of the polyhydric alcohol (b1) is preferably from 1 part by weight to 40 parts by weight, particularly preferably from 5 parts by weight to 30 parts by weight, more preferably from 10 parts by weight to 25 parts by weight with respect to 100 parts by weight of the PVA resin (A). When such content of the polyhydric alcohol (b1) is excessively large, the water-soluble film tends to be excessively hard, and tends to be brittle under a low-humidity environment. When the content is excessively small, the water-soluble film tends to be so soft that its blocking is liable to occur.

In addition, the content of the polyhydric alcohol (b2) is preferably from 1 part by weight to 40 parts by weight, particularly preferably from 5 parts by weight to 35 parts by weight, more preferably from 10 parts by weight to 30 parts by weight with respect to 100 parts by weight of the PVA resin (A). When such content of the polyhydric alcohol (b2) is excessively large, the water-soluble film tends to be so soft that its blocking is liable to occur. When the content is excessively small, the water-soluble film tends to be excessively hard, and tends to be brittle under a low-humidity environment.

Further, the content of the polyhydric alcohol (b3) is preferably from 0.5 parts by weight to 20 parts by weight, particularly preferably from 2 parts by weight to 15 parts by weight, more preferably from 3 parts by weight to 10 parts by weight with respect to 100 parts by weight of the PVA resin (A). When such content of the polyhydric alcohol (b3) is excessively small, the formability of the water-soluble film tends to reduce, and when the content is excessively large, the pinhole resistance thereof tends to reduce.

In addition, with regard to a mutual ratio among the three kinds of polyhydric alcohols (b1), (b2), and (b3) to be incorporated into the plasticizer (B), first, the content ratio (X) of the polyhydric alcohol (b3) with respect to the total amount of the polyhydric alcohols (b1), (b2), and (b3) needs to be 15 wt. % or less. That is, this is because when the content ratio (X) of the polyhydric alcohol (b3) is excessively large, there is a risk in that a change between the states of the water-soluble film at the time of normal temperature and at the time of high temperature becomes larger, and hence the pinhole resistance and bag breakage resistance of the film reduce. The content ratio (X) is preferably from 0.5 wt. % to 15 wt. % in terms of the easy formability, pinhole resistance, and bag breakage resistance of the film among others, and is particularly preferably from 2 wt. % to 14 wt. %, more preferably from 4 wt. % to 13 wt. %.

The content of the polyhydric alcohol (b2) is preferably larger than the respective contents of the other polyhydric alcohols (b1) and (b3) in terms of the flexibility of the water-soluble film, and the content ratio thereof is particularly preferably 50 wt. % or more with respect to the total amount of the polyhydric alcohols (b1), (b2), and (b3).

In addition, the content ratio (b3/b1) of the polyhydric alcohol (b3) to the polyhydric alcohol (b1) is preferably from 0.02 to 8, particularly preferably from 0.05 to 5, more preferably from 0.1 to 3 in terms of weight ratio. When such content ratio is excessively small, the formability of the water-soluble film tends to reduce. In contrast, when the content ratio is excessively large, the pinhole resistance and bag breakage resistance thereof tend to reduce.

Further, the content ratio (b3/b2) of the polyhydric alcohol (b3) to the polyhydric alcohol (b2) is preferably from 0.02 to 8, particularly preferably from 0.05 to 5, more preferably from 0.1 to 3 in terms of weight ratio. When such content ratio is excessively small, there is a risk in that the water-soluble film becomes soft and bag breakage occurs. In contrast, when the content ratio is excessively large, the pinhole resistance and bag breakage resistance thereof tend to reduce.

A filler (C), a surfactant (D), or the like may be further incorporated into the water-soluble film of the present disclosure as required.

The filler (C) is incorporated for a blocking resistance purpose, and specific examples thereof include an inorganic filler and an organic filler. Of those, the organic filler is suitably used. In addition, the average particle diameter of the filler (C) is preferably from 0.1 µm to 50 µm, particularly preferably from 0.5 µm to 40 µm. The average particle diameter may be measured with, for example, a laser diffraction-type particle size distribution-measuring apparatus.

The average particle diameter of the inorganic filler is preferably from 1 µm to 10 µm. When such average particle diameter is excessively small, the dispersibility of the water-soluble film in water tends to be small. When the average particle diameter is excessively large, at the time of the stretching of the water-soluble film in its forming processing, a pinhole tends to occur or its appearance tends to be poor.

Specific examples of the inorganic filler include talc, clay, silicon dioxide, diatomaceous earth, kaolin, mica, asbestos, gypsum, graphite, glass balloons, glass beads, calcium sulfate, barium sulfate, ammoniumsulfate, calcium sulfite, calciumcarbonate, calcium carbonate whisker, magnesium carbonate, dawsonite, dolomite, potassium titanate, carbon black, glass fibers, alumina fibers, boron fibers, processed mineral fibers, carbon fibers, hollow carbon spheres, bentonite, montmorillonite, copper powder, sodium sulfate, potassium sulfate, zinc sulfate, copper sulfate, iron sulfate, magnesium sulfate, aluminum sulfate, aluminum potassium sulfate, ammonium nitrate, sodium nitrate, potassium nitrate, aluminum nitrate, ammonium chloride, sodium chloride, potassium chloride, magnesium chloride, calcium chloride, sodium phosphate, and potassium chromate. Those inorganic fillers may be used alone or in combination thereof.

The average particle diameter of the organic filler is preferably from 0.5 µm to 50 µm, particularly preferably from 1 µm to 40 µm, more preferably from 2 µm to 30 µm, still more preferably from 3 µm to 25 µm. When such average particle diameter is excessively small, cost for the formation of the water-soluble film tends to increase. When the average particle diameter is excessively large, at the time of the stretching of the water-soluble film in its forming processing, a pinhole tends to occur.

Examples of such organic filler include biodegradable resins, such as starch, a melamine resin, a polymethyl (meth) acrylate resin, a polystyrene resin, and a polylactic acid. A biodegradable resin, such as a polymethyl (meth) acrylate resin, a polystyrene resin, or starch, is particularly suitably used as the organic filler. Those fillers may be used alone or in combination thereof.

Examples of the starch include raw starches (e.g., corn starch, potato starch, sweet potato starch, wheat starch, cassava starch, sago starch, tapioca starch, sorghum starch, rice starch, legume starch, pueraria starch, bracken starch, Nelumbo nucifera starch, and water chestnut starch), physically modified starches (e.g., α-starch, fractionated amylose, and heat-moisture-treated starch), enzymatically modified starches (e.g., hydrolyzed dextrin, enzyme-decomposed dextrin, and amylose), chemically degraded starches (e.g., acid-treated starch, hypochlorous acid-oxidized starch, and dialdehyde starch), and chemically modified starch derivatives (e.g., esterified starch, etherified starch, cationized starch, and cross-linked starch). Of those, the raw starches, in particular, the corn starch or the rice starch is preferably used in terms of ease of availability and cost efficiency. Those starches may be used alone or in combination thereof.

The content of the filler (C) is preferably from 1 part by weight to 30 parts by weight, particularly preferably from 2 parts by weight to 25 parts by weight, more preferably from 2.5 parts by weight to 20 parts by weight with respect to 100 parts by weight of the PVA resin (A). When such content is excessively small, the blocking resistance of the water-soluble film tends to reduce. When the content is excessively large, at the time of the stretching of the water-soluble film in its forming processing, a pinhole tends to occur.

In addition, the surfactant (D) serving as an optional component of the present disclosure is used for the purpose of improving peelability from a cast surface at the time of the formation of the water-soluble film, and typical examples thereof include a nonionic surfactant, a cationic surfactant, and an anionic surfactant. Examples of the nonionic surfactant include polyoxyethylene nonyl phenyl ether, polyoxyethylene octyl nonyl ether, polyoxyethylene dodecyl phenyl ether, polyoxyethylene alkyl allyl ethers, polyoxyethylene sorbitan monolaurate, polyoxyethylene sorbitan monopalmitate, polyoxyethylene sorbitan monostearate, polyoxyethylene sorbitan monooleate, polyoxyalkylene alkyl ether phosphate monoethanolamine salts, and polyoxyethylene alkylamino ethers, such as polyoxyethylene laurylamino ether and polyoxyethylene stearylamino ether. Of those, the polyoxyalkylene alkyl ether phosphate monoethanolamine salts and polyoxyethylene laurylamino ether are suitable in terms of production stability. Those nonionic surfactants may be used alone or in combination thereof.

The content of such surfactant (D) is preferably from 0.01 parts by weight to 3 parts by weight, particularly preferably from 0.1 parts by weight to 2.5 parts by weight, more preferably from 0.5 parts by weight to 2 parts by weight with respect to 100 parts by weight of the PVA resin (A). When such content is excessively small, peelability between the cast surface of a film-forming apparatus and the formed water-soluble film tends to reduce to cause a reduction in productivity of the film. When the content is excessively large, an inconvenience, such as a reduction in adhesive strength at the time of sealing to be performed in the case where the water-soluble film is formed into a package, tends to occur.

The water-soluble film of the present disclosure may further include, for example, another water-soluble polymer (e.g., sodium polyacrylate, polyethylene oxide, polyvinylpyrrolidone, dextrin, chitosan, chitin, methyl cellulose, or hydroxyethyl cellulose), a perfume, a rust inhibitor, a colorant, an extender, an antifoaming agent, a UV absorber, liquid paraffins, a fluorescent whitening agent, or a bitter component (e.g., denatonium benzoate) to the extent that the object of the present disclosure is not inhibited. Those components may be used alone or in combination thereof.

In addition, the water-soluble film of the present disclosure has preferably blended therein an antioxidant in terms of the suppression of its yellowing. Examples of such antioxidant include: sulfurous acid salts, such as sodium sulfite, potassium sulfite, calcium sulfite, and ammonium sulfite; tartaric acid; ascorbic acid; sodium thiosulfate; catechol; and Rongalite. Of those, the sulfurous acid salts are preferred, and sodium sulfite is particularly preferred. The blending amount of such antioxidant is preferably from 0.1 parts by weight to 10 parts by weight, particularly preferably from 0.2 parts by weight to 5 parts by weight, more preferably from 0.3 parts by weight to 3 parts by weight with respect to 100 parts by weight of the PVA resin (A).

The water-soluble film of the present disclosure may be obtained, for example, as described below. That is, a resin composition containing the PVA resin (A) and the plasticizer (B), and, as required, the filler (C), the surfactant (D), and the like is dissolved or dispersed in water to provide a film-forming raw material. Then, the film-forming raw material is formed into a film to provide the target water-soluble film. A method, such as a melt extrusion method or a casting method, may be adopted as a method for such film formation, and the casting method is preferred in terms of the accuracy of the thickness of the film.

The film formation based on the casting method is performed, for example, as described below. First, water is added to the PVA resin (A) (powder) to prepare a PVA resin aqueous solution, and the plasticizer (B) and, as required, a substance to be blended, such as the filler (C) or the surfactant (D), are added to the aqueous solution to provide an aqueous dispersion or aqueous solution of the resin composition. Alternatively, water is added to the resin composition containing the PVA resin (A) and the plasticizer (B), and various substances to be blended to provide the aqueous dispersion or aqueous solution of the resin composition.

The solid content concentration of such aqueous dispersion or aqueous solution of the resin composition is preferably from 10 wt. % to 50 wt. %, particularly preferably from 15 wt. % to 40 wt. %, more preferably from 20 wt. % to 35 wt. %. When such concentration is excessively low, the productivity of the water-soluble film tends to reduce, and when the concentration is excessively high, the viscosity of the aqueous dispersion or the aqueous solution tends to be so high that the degassing of dope requires time or a die line occurs at the time of the formation of the water-soluble film. Further, when the temperature of the metal surface of an endless belt or a drum roll is excessively low, the drying of the aqueous dispersion or the aqueous solution tends to require time, and when the temperature is excessively high, foaming tends to occur in the aqueous dispersion or the aqueous solution at the time of the film formation.

Normal-temperature dissolution, high-temperature dissolution, pressure dissolution, or the like is typically adopted as a method of dissolving the resin composition. Of those, the high-temperature dissolution and the pressure dissolution are preferred because each of the methods produces a small amount of undissolved matter and is hence excellent in productivity. A dissolution temperature is typically from 80° C. to 100° C., preferably from 90° C. to 100° C. in the case of the high-temperature dissolution, and is typically from 80° C. to 130° C., preferably from 90° C. to 120° C. in the case of the pressure dissolution. A dissolution time is typically from 1 hour to 20 hours, preferably from 2 hours to 15 hours, particularly preferably from 3 hours to 10 hours. When the dissolution time is excessively short, the undissolved matter tends to remain, and when the dissolution time is excessively long, the productivity tends to reduce.

In addition, in the dissolving step, a stirring blade is, for example, a paddle, FULLZONE, MAXBLEND, TWIN-STAR, anchor, ribbon, or propeller stirring blade.

Further, after the dissolution, the resultant PVA resin aqueous solution is subjected to degassing treatment, and a method for such degassing is, for example, static degassing, vacuum degassing, or biaxial extrusion degassing. Of those, the static degassing or the biaxial extrusion degassing is preferred. In addition, in the case of, for example, the static degassing, its temperature is typically from 50° C. to 100° C., preferably from 70° C. to 95° C., and its degassing time is typically from 2 hours to 30 hours, preferably from 5 hours to 20 hours.

Then, the film-forming raw material formed of the aqueous dispersion or the aqueous solution is passed through a slit, such as a T-die, is cast on a cast surface, such as the metal surface of an endless belt or a drum roll, or the surface of a plastic substrate, for example, a polyethylene terephthalate film, is dried, and is further subjected to heat treatment as required to be formed into a film. Thus, the water-soluble film of the present disclosure can be obtained. Preferred film formation conditions are as described below.

First, the temperature of a portion configured to eject the aqueous dispersion or aqueous solution of the PVA resin composition is preferably from 60° C. to 98° C., particularly preferably from 70° C. to 95° C. When such temperature is excessively low, time for the drying tends to lengthen to reduce the productivity of the water-soluble film. When the temperature is excessively high, foaming or the like tends to occur in the aqueous dispersion or the aqueous solution.

In addition, at the time of the film formation, a film formation speed is preferably from 3 m/min to 80 m/min, particularly preferably from 5 m/min to 60 m/min, more preferably from 8 m/min to 50 m/min. Then, in the heat treatment, the film-forming raw material may be treated with a heat roll, and floating, far-infrared ray treatment, and the like are also given as other examples of a method for the treatment. In particular, the heat treatment with the heat roll is preferred in terms of the productivity. A heat treatment temperature is preferably from 50° C. to 150° C., particularly preferably from 70° C. to 130° C., and a heat treatment time is preferably from 1 second to 60 seconds, particularly preferably from 3 seconds to 50 seconds, more preferably from 5 seconds to 40 seconds.

In addition, the water-soluble film may be obtained by: casting the aqueous dispersion or aqueous solution of the resin composition on a plastic substrate, such as a polyethylene terephthalate film or a polyethylene film, or a metal substrate with an applicator; and drying the aqueous dispersion or the aqueous solution.

In addition, the film formation is preferably performed under an environment at, for example, from 10° C. to 35° C., in particular, from 15° C. to 30° C. The humidity at which the film formation is performed is typically 70% RH or less.

The thickness of the water-soluble film of the present disclosure to be obtained as described above, which is appropriately selected in accordance with its applications and the like, is preferably from 10 μm to 120 μm, particularly preferably from 30 μm to 110 μm, more preferably from 45 μm to 100 μm. When such thickness is excessively small, the mechanical strength of the film tends to reduce. When the thickness is excessively large, the rate at which the film is dissolved in water tends to reduce, and the efficiency of film formation also tends to reduce.

In addition, the width of the water-soluble film, which is also appropriately selected in accordance with the applications and the like, is preferably from 300 mm to 5,000 mm, particularly preferably from 500 mm to 4,000 mm, more preferably from 800 mm to 3,000 mm. When such width is excessively small, the production efficiency of the film tends to reduce, and when the width is excessively large, it tends to be difficult to control the sagging or thickness of the film.

Further, the length of the water-soluble film, which is also appropriately selected in accordance with the applications and the like, is preferably from 500 m to 20,000 m, particularly preferably from 800 m to 15,000 m, more preferably from 1,000 m to 10,000 m. When such length is excessively small, labor tends to be required in the switching of the film. When the length is excessively large, the appearance of the film tends to be poor owing to its tight winding, or the weight thereof tends to be excessively heavy.

In addition, the surface of the water-soluble film may be plain, but in terms of the blocking resistance of the film, the slidability thereof at the time of its processing, the alleviation of adhesiveness between the films serving as products, and the appearance thereof, it is preferred that one surface or both surfaces of the film be subjected to texturing processing for imparting, for example, an embossed pattern, a fine uneven pattern, or a special engraving design.

At the time of such texturing processing, a processing temperature is typically from 60° C. to 150° C., preferably from 80° C. to 140° C. A processing pressure is typically from 2 MPa to 8 MPa, preferably from 3 MPa to 7 MPa. A processing time is typically from 0.01 seconds to 5 seconds, preferably from 0.1 seconds to 3 seconds, though the processing time varies depending on the processing pressure and the film formation speed.

In addition, cooling treatment may be performed after the texturing processing treatment as required for preventing unintentional stretching of the film due to heat.

In addition, in the present disclosure, the water content of the resultant water-soluble film is preferably from 3 wt. % to 15 wt. % in terms of its mechanical strength and sealability, and is particularly preferably from 5 wt. % to 14 wt. %, more preferably from 6 wt. % to 13 wt. %. When such water content is excessively low, the film tends to be excessively hard, and when the water content is excessively high, its blocking is liable to occur. The adjustment of the water content to such value may be achieved by appropriately setting a drying condition and a humidification condition.

The water content is measured in conformity with JIS K 6726 3.4, and the value of the resultant volatile content is defined as the water content.

In the present disclosure, the resultant water-soluble film may be wound around a core pipe (S1) to provide a film roll. Although the resultant film roll may be supplied as it is as a product, the film is preferably wound around a core pipe (S2) having a length commensurate with a film width of a desired size to be supplied as a film roll.

The core pipe (S1) around which the water-soluble film is wound is cylindrical, and a metal, a plastic, or the like may be appropriately selected as a material therefor, but the metal is preferred in terms of the fastness and strength of the core pipe.

The inner diameter of the core pipe (S1) is preferably from 3 cm to 30 cm, more preferably from 10 cm to 20 cm.

The wall thickness of the core pipe (S1) is preferably from 1 mm to 30 mm, more preferably from 2 mm to 25 mm.

The length of the core pipe (S1) needs to be made longer than the width of the film, and the core pipe is preferably made to protrude from each of the end portions of the film roll by from 1 cm to 50 cm.

In addition, the core pipe (S2) is cylindrical, and paper, a metal, a plastic, or the like may be appropriately selected as a material therefor, but the paper is preferred in terms of a reduction in weight of the core pipe and the handling thereof.

The inner diameter of the core pipe (S2) is preferably from 3 cm to 30 cm, more preferably from 10 cm to 20 cm.

The wall thickness of the core pipe (S2) is preferably from 1 mm to 30 mm, more preferably from 3 mm to 25 mm.

The length of the core pipe (S2) only needs to be a length equal to or longer than the film width of the water-soluble film prepared as a product, and is preferably equal to or longer than the width by up to 50 cm.

When the water-soluble film is wound around the core pipe (S2), a slit having a desired width is preferably made in the water-soluble film. A shear blade, a razor blade, or the like is used in the formation of such slit, but the slit is preferably formed with the shear blade in terms of the smoothness of a section of the slit.

Then, the water-soluble film of the present disclosure wound in a roll shape (the film in the state is hereinafter referred to as "fill roll") is preferably packaged with a cover film formed of a resin having a water vapor barrier property. Such cover film is not particularly limited, but a cover film having a moisture permeability of 10 g/m$^2$·24 hr (measured in conformity with JIS Z 0208) or less may be used. The cover film is specifically, for example, a single-layer film made of a high-density polyethylene, a low-density polyethylene, a polypropylene, a polyester, a polyvinylidene chloride-coated polypropylene, a glass-deposited polyester, or the like, or a laminated film thereof, or a laminated film thereof with a split cloth, paper, or a nonwoven fabric. Examples of the former laminated film include: a laminated film of a glass-deposited polyester and a polyethylene; and a laminated film of a polyvinylidene chloride-coated polypropylene and a polyethylene.

Such cover film is preferably subjected to antistatic treatment in terms of the prevention of the inclusion of foreign matter, and an antistatic agent may be kneaded into the film or its surface may be coated with the agent. When the antistatic agent is kneaded into the film, the agent is used in an amount of from about 0.01 wt. % to about 5 wt. % with respect to the resin forming the film, and when the surface is coated with the agent, the agent is used in an amount of from about 0.01 g/m$^2$ to about 1 g/m$^2$.

For example, an alkyl diethanolamine, a polyoxyethylene alkylamine, a higher fatty acid alkanolamide, or a sorbitan fatty acid ester is used as the antistatic agent.

Next, the film roll packaged with the cover film is preferably further packaged with a packaging film formed of an aluminum material. Examples of such packaging film include an aluminum foil, a laminated film of an aluminum foil and a moisture-resistant plastic film (e.g., a laminated film of an aluminum foil and a polyethylene film), a laminated film of an aluminum-deposited film and a moisture-resistant plastic film (e.g., a laminated film of an aluminum-deposited polyester film and a polyethylene film), and a laminated film of an alumina-deposited film and a moisture-resistant plastic film (e.g., a laminated film of an alumina-deposited polyester film and a polyethylene film). In particular, in the present disclosure, a laminated film of an aluminum foil and a polyolefin film, or a laminated film of an aluminum-deposited film and a polyolefin film is useful, and a laminated film having a structure of a stretched polypropylene film/a polyethylene film/an aluminum foil/a polyethylene film, a laminated film having a structure of a stretched polypropylene film/a low-density polyethylene film/an aluminum foil, or the like is particularly useful.

At the time of the packaging, it is sufficient that the film roll be sequentially packaged with the cover film formed of the resin having a water vapor barrier property serving as an inner side, and the packaging film formed of the aluminum material serving as an outer side, and margins of the films in their width directions be pushed into the core pipe.

In order that flaws in the end portions of the film roll and the adhesion of foreign matter, such as dust, thereto may be prevented, protective pads having core pipe through-holes may be mounted on both end portions of the film roll directly or after the film roll has been packaged with the packaging film.

A practical shape of each of the protective pads is a disc-shaped sheet or film so as to conform to the film roll. A buffer function based on, for example, a foam, a fabric shape, or a nonwoven fabric shape is desirably imparted to each of the pads for making their protective effects significant. In addition, a desiccant may be separately incorporated into the film roll, or may be laminated on or mixed in each of the protective pads for protecting the film roll from moisture.

An advantageous material for each of the protective pads is a plastic, and specific examples thereof include a polystyrene, a polyethylene, a polypropylene, a polyester, and a polyvinyl chloride.

In addition, examples of the protective pad containing the desiccant include: a moisture-absorbing layer obtained by dispersing or impregnating a desiccant or a water-absorbing agent, such as calcium chloride, silica gel, a molecular sieve, a saccharide, in particular, a saccharide having a high osmotic pressure, or a water-absorbing resin, in a formable material, such as a natural cellulose, a synthetic cellulose, a glass cloth, or a nonwoven fabric, or applying the desiccant or the water-absorbing agent to the material, and drying the material having dispersed or impregnated therein, or applied thereto the desiccant or the water-absorbing agent; and a product obtained by sandwiching such desiccant or water-absorbing agent between the formable materials or thermoplastic resin films, such as a polyester film, a polyethylene film, a polypropylene film, and a Teflon (trademark) film.

As examples of a commercially available sheet-shaped desiccant, there are given "I.D. SHEET" manufactured by ID Corporation, "ALLOSHEET" and "ZEOSHEET" manufactured by Shinagawa Chemical Industry Co., Ltd., and "HI-SHEET DRY" manufactured by Hi-Sheet Industries.

The film roll packaged with such means is preferably stored or transported under a so-called air-floating state without being in contact with the ground by being supported through the arrangement of brackets (support plates) at protruding portions at both ends of the core pipe or the mounting of the protruding portions at both ends on stands. When the width of the film is relatively small, the brackets are used, and when the width of the film is relatively large, the stands are used.

Each of the brackets is formed of plywood or a plastic plate, and its size only needs to be such that the four sides of the bracket are larger than the diameter of the film roll.

Then, a pair of the brackets is arranged on the film roll as follows: the brackets are vertically placed at the core pipe-protruding portions at both ends of the film roll so as to face each other, and are fitted thereinto. The fitting may be performed by arranging a bored hole somewhat larger than the diameter of the core pipe in the central portion of each of the brackets or boring a range from the upper portion of each of the brackets to the central portion thereof in a U-shaped manner so that the core pipe may be easily inserted.

The film roll supported with the brackets is stored or transported after having been accommodated in a carton, such as a cardboard box. However, in order that the operation at the time of the accommodation may be smoothly performed, when rectangular brackets are used, the four corners of each of the brackets are preferably cut off.

In addition, it is advantageous to fix both the brackets with a binding tape so that the pair of brackets may not wobble, and at the time, it is practical to arrange a tape shift-preventing groove comparable in size to the width of the tape on a side surface (thickness portion) of each of the brackets so that the movement or sagging of the tape may not occur.

At the time of storage or transportation of the packaged film roll, an extremely high temperature condition, an extremely low temperature condition, an extremely low humidity condition, and an extremely high humidity condition are desirably avoided. Specifically, a temperature of from 10° C. to 30° C. and a humidity of from 40% RH to 75% RH are desirable.

As described above, the water-soluble film of the present disclosure can be provided in various forms. In addition, its applications are not particularly limited, but the film is useful in, for example, various packaging applications out of the applications, and is particularly useful in an application where a chemical agent or the like is packaged as a unit. The chemical agent is not particularly limited, and may be any one of an alkaline chemical agent, a neutral chemical agent, and an acidic chemical agent. The shape of the chemical agent may be any one of shapes, such as a granule, a tablet, a powder, and a liquid. The film is particularly useful in packaging a liquid chemical agent, such as a liquid detergent, to be used by being dissolved or dispersed in water.

The pH value of the liquid chemical agent when dissolved or dispersed in water is preferably from 6 to 12, particularly preferably from 7 to 11, and the water content of the liquid chemical agent is preferably 15 wt. % or less, particularly preferably from 0.1 wt. % to 10 wt. %, more preferably from 0.1 wt. % to 7 wt. %. When the conditions are satisfied, the film does not gel or become insoluble, and is hence excellent in water solubility.

The pH value is measured in conformity with JIS K 3362 8.3. In addition, the water content is measured in conformity with JIS K 3362 7.21.3.

Examples of the liquid chemical agent include liquid chemical agents to be used for, for example, various kinds of washing, such as the laundry of clothing and the like, and the washing of eating utensils and the like, sterilization, and surface finish. Specific examples thereof include a liquid detergent, a fabric softener, an aromatic finishing agent, and a bleaching/sterilizing agent. The water-soluble film is suitably used for the liquid detergent out of those described above.

<Chemical Agent Package>

A chemical agent package of the present disclosure includes a package bag formed of the water-soluble film, and a liquid chemical agent included in the package bag. In addition, the chemical agent package is configured as follows: the chemical agent package holds such a shape as to include the liquid chemical agent therein at the time of its conveyance or storage; and at the time of its use (e.g., at the time of washing), the package bag formed of the water-soluble film is brought into contact with water to be dissolved therein, and the liquid chemical agent included therein flows out and diffuses into the water, and hence the chemical agent is brought into contact with an object to exhibit its chemical effect.

With regard to the size of the chemical agent package of the present disclosure, its length is typically from 10 mm to 50 mm, preferably from 20 mm to 40 mm. In addition, the film thickness of the package bag formed of the water-soluble film is typically from 10 μm to 120 μm, preferably from 15 μm to 110 μm, particularly preferably from 20 μm to 100 μm. The amount of the liquid chemical agent to be included in the package bag is typically from 5 mL to 50 mL, preferably from 10 mL to 40 mL.

In addition, the outer surface of the package bag formed of the water-soluble film serving as the surface of the chemical agent package of the present disclosure is preferably subjected to texturing processing for imparting, for example, an embossed pattern, a fine uneven pattern, or a special engraving design in terms of the blocking resistance of the chemical agent package, the slidability thereof at the time of its processing, the alleviation of adhesiveness between the products (packages), and the appearance thereof, but the surface may be smooth.

When the package is provided by packaging the liquid chemical agent with the water-soluble film of the present disclosure, a known method may be adopted. For example, first, the water-soluble film is mounted on a die in which many recessed portions are arranged, and the die is heated to high temperature (e.g., from 50° C. to 60° C.) to soften the water-soluble film. Then, the water-soluble film is formed into an uneven shape along the respective recessed portions by vacuum forming. After that, the liquid chemical agent weighed in a predetermined amount is filled into each recessed portion of the water-soluble film, and another water-soluble film is superimposed thereon. Then, the openings of the respective recessed portions are sealed. Thus, an intermediate formed article having hermetically sealed therein predetermined amounts of the liquid chemical agent is obtained. Then, the intermediate formed article is removed from the die, and is cut into individual pieces. Thus, a chemical agent package of a unit packaging type can be obtained.

A method involving superimposing the water-soluble films to seal the openings is, for example, water sealing involving using water, or adhesive sealing involving using an adhesive in addition to the heat sealing involving sealing the openings under a state in which at least one of the water-soluble films is heated to be softened. Of those, a method based on the water sealing involving using water is versatile and advantageous.

EXAMPLES

Now, the present disclosure is more specifically described by way of Examples. The present disclosure is not limited to Examples below without departing from the gist of the present disclosure.

The terms "part(s)" and "%" in the examples are on a weight basis.

The following PVA resins were prepared as the PVA resin (A).

Carboxyl group-modified PVA (A1): 4% aqueous solution viscosity at 20° C.: 22 mPa·s, average saponification degree: 96 mol %, modification amount with maleic acid monomethyl ester: 4.0 mol %

Carboxyl group-modified PVA (A2): 4% aqueous solution viscosity at 20° C.: 22 mPa·s, average saponification degree: 94 mol %, modification amount with maleic acid monomethyl ester: 2.0 mol %

Unmodified PVA (A3): 4% aqueous solution viscosity at 20° C.: 18 mPa·s, average saponification degree: 88 mol %

The following plasticizers were prepared as the plasticizer (B).

Polyhydric alcohol (b1): sorbitol (melting point: 95° C.)
Polyhydric alcohol (b2): glycerin (melting point: 18° C.)
Polyhydric alcohol (b3): trimethylolpropane (melting point: 58° C.)

The following fillers were prepared as the filler (C).
Silica (c1): average particle diameter: 8 μm
Starch (c2): average particle diameter: 20 μm Example 1

90 Parts of the carboxyl group-modified PVA (A1) and 10 parts of the unmodified PVA (A3), serving as the PVA resin (A), 13.5 parts of the sorbitol (b1), 24 parts of the glycerin (b2), and 5 parts of the trimethylolpropane (b3) serving as the plasticizer (B), 4 parts of the silica (c1) (average particle diameter: 8 μm) serving as the filler (C), 2 parts of a polyoxyalkylene alkyl ether phosphate monoethanolamine salt serving as the surfactant (D), and water were mixed, and the mixture was subjected to dissolution treatment to provide a PVA aqueous solution having dispersed therein the filler (solid content concentration: 25%).

The resultant PVA aqueous solution was degassed at 80° C., and was left to cool to 40° C. The PVA aqueous solution was cast on a polyethylene terephthalate film, and the resultant was passed through the inside of a 3-meter drying chamber (105° C.) at a speed of 0.350 m/min to be dried. Thus, a water-soluble film having a thickness of 89 μm was obtained.

Example 2 and Comparative Examples 1 to 3

Four kinds of water-soluble films different from that of Example 1 in composition and the like were each obtained in the same manner as in Example 1 except that the kinds and amounts of the raw materials were changed as shown in Table 1.

The tensile storage moduli ($E_{23}$, $E_{60}$) of each of the resultant water-soluble films when the temperature of the film was 23° C. and when the temperature was 60° C. were each measured by the following method, and a tensile storage modulus change ratio Y ($E_{23}/E_{60}$) between temperatures of 23° C. and 60° C. was calculated and evaluated. The results are shown in Table 1 to be described later.

<Method of Measuring Tensile Storage Modulus ($E_{23}$) or ($E_{60}$)>

A film measuring 2 cm long by 5 mm wide was cut out of a central portion in the width direction of a water-soluble film of interest, and was dried in a vacuum at 80° C. After that, the dried film was further dried with diphosphorus pentoxide to prepare a measurement test sample. The tensile storage modulus of the resultant measurement test sample at 23° C. ($E_{23}$) and the tensile storage modulus thereof at 60° C. ($E_{60}$) were measured by continuously measuring its tensile storage moduli with a dynamic viscoelasticity-measuring apparatus "DVA-225" at a measurement frequency of 10 Hz while increasing the temperature of the film from −70° C. to 180° C. at a rate of temperature increase of 5° C./min.

<Method of Calculating Change Ratio (Y) between Elastic Moduli at 23° C. and 60° C.>

The tensile storage modulus at 23° C. ($E_{23}$) and the tensile storage modulus at 60° C. ($E_{60}$) measured as described above were used to calculate the change ratio (Y) therebetween from the following equation (1).

$$Y = E_{23}/E_{60} \qquad (1)$$

TABLE 1

| | | | Example 1 | Example 2 | Comparative Example 1 | Comparative Example 2 | Comparative Example 3 |
|---|---|---|---|---|---|---|---|
| | | | | | | | (Parts by weight) |
| Feature of water-soluble film | PVA resin (A) | Carboxyl group-modified PVA (A1) | 90 | 90 | 90 | 90 | — |
| | | Carboxyl group-modified PVA (A2) | — | — | — | — | 100 |
| | | Unmodified PVA (A3) | 10 | 10 | 10 | 10 | — |
| | Plasticizer (B) | Sorbitol (b1) | 13.5 | 15 | 20 | 12.5 | — |
| | | Glycerin (b2) | 24 | 20 | 20 | 18.8 | 16 |
| | | Trimethylolpropane (b3) | 5 | 5 | — | 6.3 | 10 |
| | Filler (C) | Silica (c1) | 4 | — | 4 | 4 | — |
| | | Starch (c2) | — | 8 | — | — | 8 |
| | Content ratio X of (b3) with respect to total amount of (b1), (b2), and (b3) (%) | | 11.8 | 12.5 | — | 16.8 | 38 |
| | Thickness (μm) | | 89 | 91 | 87 | 90 | 91 |
| | Tensile storage modulus (23° C.) $E_{23}$ (MPa) | | 1,530 | 1,790 | 2,370 | 1,970 | 2,150 |
| | Tensile storage modulus (60° C.) $E_{60}$ (MPa) | | 59.9 | 75.2 | 82.9 | 66.8 | 74.9 |
| | Tensile storage modulus change ratio Y ($E_{23}/E_{60}$) | | 25.5 | 23.8 | 28.6 | 29.5 | 28.7 |

As can be seen from the results shown in Table 1 described above, in each of the films of Examples 1 and 2 in which the content ratio X of the polyhydric alcohol (b3) with respect to the total amount of the polyhydric alcohols (b1)+(b2)+(b3) in the plasticizer (B) is designed to be 15% or less, the tensile storage modulus change ratio Y is suppressed to a low level. Therefore, it is found that each of the films is hardly influenced by a change between temperatures at the time of its normal state and at the time of its forming, and is hence excellent in pinhole resistance and bag breakage resistance. Meanwhile, it is found that in each of the film of Comparative Example 1 free of the polyhydric alcohol (b3), the film of Comparative Example 3 free of the polyhydric alcohol (b1), and the film of Comparative Example 2 in which the content ratio X of the polyhydric alcohol (b3) is more than 15%, the tensile storage modulus change ratio Y is large, and hence a pinhole or bag breakage is liable to occur at the time of the use of the film. It is found from such results that even when a chemical agent package is provided by packaging, for example, a liquid detergent with the water-soluble film of each of Examples, a chemical agent package excellent in pinhole resistance and bag breakage resistance can be produced, and the resultant chemical agent package is free from problems such as the film gelling or becoming insoluble, and hence serves as a satisfactory chemical agent package.

Specific modes in the present disclosure have been described in Examples described above, but Examples described above are merely illustrative and should not be construed as being limitative. Various modifications apparent to a person skilled in the art are meant to fall within the scope of the present disclosure.

The water-soluble film of the present disclosure has excellent water solubility and easy formability when formed into a package. Moreover, the water-soluble film shows a small change in tensile storage modulus in association with its temperature change, and is hence excellent in pinhole resistance and bag breakage resistance. The water-soluble film is an excellent water-soluble film that can maintain a stable shape even when brought into a state of a package having packaged therein a liquid, such as a liquid detergent, among others. Accordingly, the water-soluble film can be used in various packaging applications, and is particularly useful in an application where a chemical agent, in particular, a liquid chemical agent, such as a liquid detergent, or the like is packaged as a unit.

The invention claimed is:

1. A water-soluble film, comprising:
   a polyvinyl alcohol resin (A); and
   a plasticizer (B),
   wherein the plasticizer (B) contains
      a polyhydric alcohol (b1) having a melting point of 80° C. or more,
      a polyhydric alcohol (b2) having a melting point of 50° C. or less, and
      a polyhydric alcohol (b3) having a melting point of more than 50° C. and less than 80° C.,
   wherein the polyhydric alcohol (b1) comprises sorbitol, the polyhydric alcohol (b2) comprises glycerin, and the polyhydric alcohol (b3) comprises trimethylolpropane, and
   wherein a content ratio (X) of the polyhydric alcohol (b3) with respect to a total amount of the polyhydric alcohol (b1), the polyhydric alcohol (b2), and the polyhydric alcohol (b3) is 15 wt. % or less.

2. The water-soluble film according to claim 1, wherein the polyvinyl alcohol resin (A) comprises an anionic group-modified polyvinyl alcohol resin.

3. The water-soluble film according to claim 1, wherein the polyvinyl alcohol resin (A) comprises an anionic group-modified polyvinyl alcohol resin and an unmodified polyvinyl alcohol.

4. The water-soluble film according to claim 1, wherein a content of the plasticizer (B) is 25 parts by weight or more with respect to 100 parts by weight of the polyvinyl alcohol resin (A).

5. The water-soluble film according to claim 1, wherein a weight content ratio (b3/b1) of the polyhydric alcohol (b3) to the polyhydric alcohol (b1) is from 0.02 to 8.

6. The water-soluble film according to claim 1, wherein a weight content ratio (b3/b2) of the polyhydric alcohol (b3) to the polyhydric alcohol (b2) is from 0.02 to 8.

7. The water-soluble film according to claim 1, wherein the water-soluble film has a water content of from 3 wt. % to 15 wt. %.

8. The water-soluble film according to claim 1, wherein the water-soluble film is used for chemical packaging.

9. A chemical agent package, comprising:
   a package bag obtained by bonding at least two water-soluble films of claim 1 to each other; and
   a liquid chemical agent included in the package bag.

10. The chemical agent package according to claim 9, wherein
   the liquid chemical agent has a pH value of from 6 to 12 when dissolved or dispersed in water, and
   the liquid chemical agent has a water content of 15 wt. % or less.

11. A water-soluble film, comprising:
   a polyvinyl alcohol resin (A); and
   a plasticizer (B),
   wherein the plasticizer (B) contains
      a polyhydric alcohol (b1) having a melting point of 80° C. or more,
      a polyhydric alcohol (b2) having a melting point of 50° C. or less, and
      a polyhydric alcohol (b3) having a melting point of more than 50° C. and less than 80° C., and
   wherein a content ratio (X) of the polyhydric alcohol (b3) with respect to a total amount of the polyhydric alcohol (b1), the polyhydric alcohol (b2), and the polyhydric alcohol (b3) is 14 wt. % or less.

12. The water-soluble film according to claim 11, wherein the polyvinyl alcohol resin (A) comprises an anionic group-modified polyvinyl alcohol resin.

13. The water-soluble film according to claim 11, wherein the polyvinyl alcohol resin (A) comprises an anionic group-modified polyvinyl alcohol resin and an unmodified polyvinyl alcohol.

14. The water-soluble film according to claim 11, wherein a content of the plasticizer (B) is 25 parts by weight or more with respect to 100 parts by weight of the polyvinyl alcohol resin (A).

15. The water-soluble film according to claim 11, wherein a weight content ratio (b3/b1) of the polyhydric alcohol (b3) to the polyhydric alcohol (b1) is from 0.02 to 8.

16. The water-soluble film according to claim 11, wherein a weight content ratio (b3/b2) of the polyhydric alcohol (b3) to the polyhydric alcohol (b2) is from 0.02 to 8.

17. The water-soluble film according to claim 11, wherein the water-soluble film has a water content of from 3 wt. % to 15 wt. %.

18. The water-soluble film according to claim 11, wherein the water-soluble film is used for chemical packaging.

19. A chemical agent package, comprising:
   a package bag obtained by bonding at least two water-soluble films of claim 11 to each other; and
   a liquid chemical agent included in the package bag.

20. The chemical agent package according to claim 19, wherein
   the liquid chemical agent has a pH value of from 6 to 12 when dissolved or dispersed in water, and
   the liquid chemical agent has a water content of 15 wt. % or less.

* * * * *